United States Patent Office 3,516,238
Patented June 23, 1970

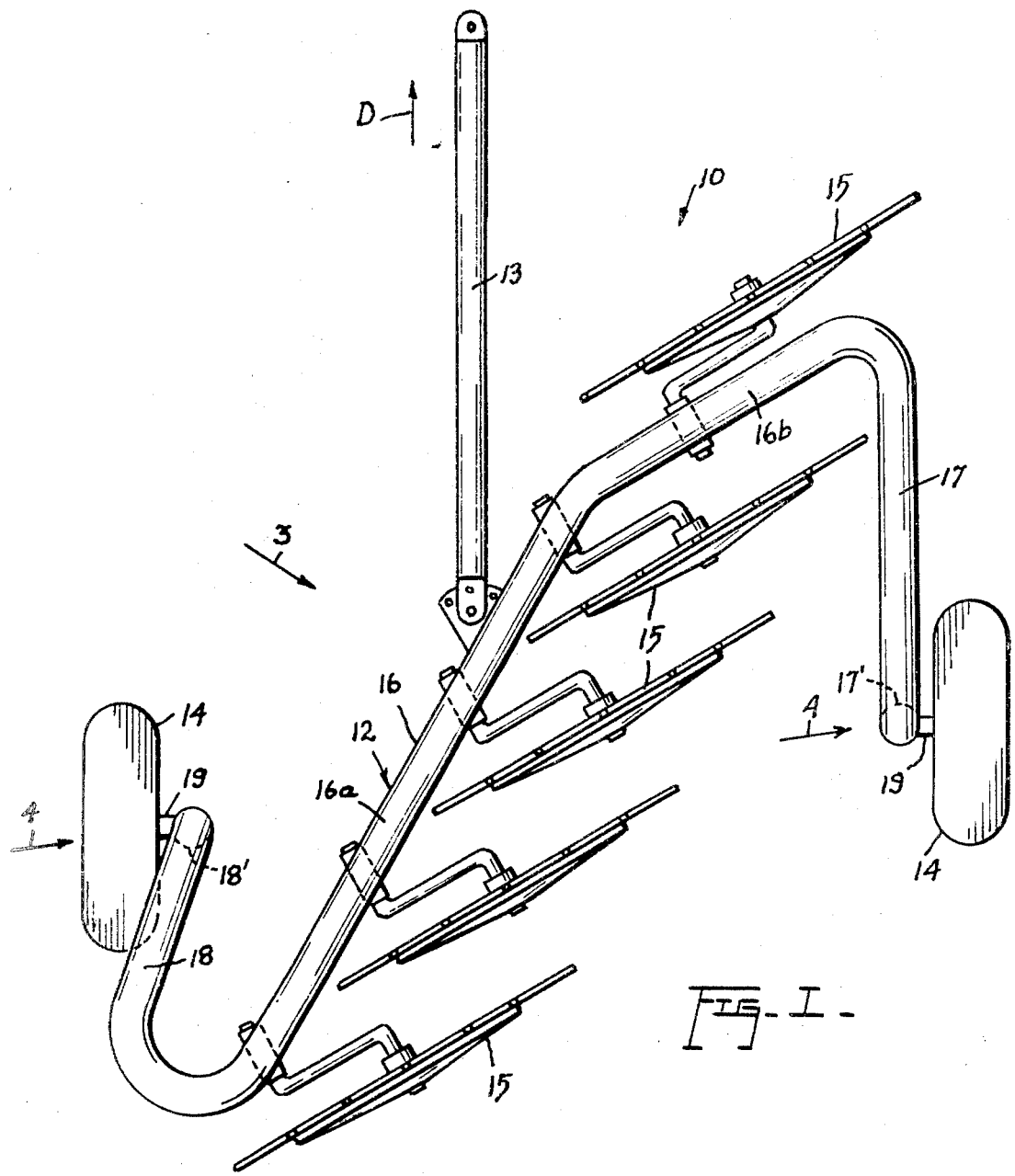
Fig. I.

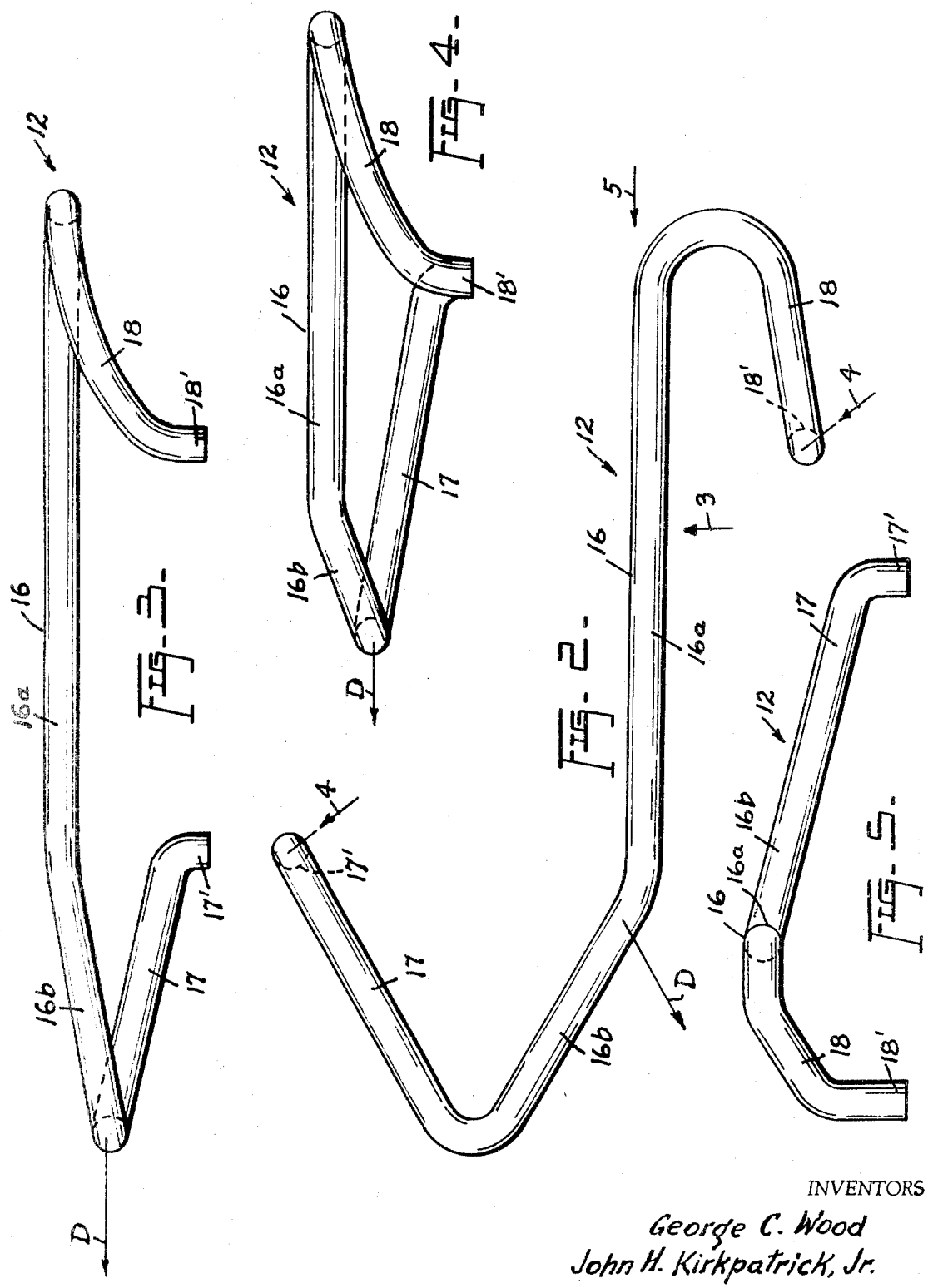

3,516,238
ROTARY SIDE DELIVERY RAKE
George C. Wood, Edenton, and John H. Kirkpatrick, Jr., Clyde, N.C., assignors to Patent & Development, Incorporated, Raleigh, N.C.
Filed Sept. 24, 1968, Ser. No. 762,038
Int. Cl. A01d 77/06
U.S. Cl. 56—377                     4 Claims

ABSTRACT OF THE DISCLOSURE

A rotary side delivery rake having a supporting frame equipped with traveling wheels and with a set of raking wheels. The frame has a slender, serpentine form and includes a main frame portion disposed substantially horizontally and obliquely to the direction of travel, and a pair of side frame portions extending respectively rearwardly and forwardly from the front and rear of the main portion, the side portions also being slanted downwardly so that the main portion is elevated to eliminate sagging. The main portion carries the raking wheels and the traveling wheels are mounted at the lower end of the side portions.

---

This invention relates to new and useful improvements in rotary side delivery rakes, and in particular the invention concerns itself with rakes of this type which have a slender, serpentine frame carrying a set of raking wheels and provided with a pair of traveling wheels. Such a frame is conveniently made from tubular stock, the frame having a main portion disposed obliquely to the direction of travel, and also having a pair of side frame portions on which the traveling wheels are mounted. The main frame portion carries the raking wheels, and since the primary support of the frame is by the traveling wheels on the frame side portions, the main frame portion is frequently subjected to sagging and deformation under the weight of the raking wheels.

The principal object of this invention is to eliminate such sagging of the main frame portion without the necessity of providing braces or other structural reinforcements which would unduly increase the weight and cost of the rake.

This object is attained by providing a rake frame of a special configuration wherein the side frame portions are extended or slanted downwardly from the main frame portion in such manner that forces imposed by the weight of the raking wheels are dissipated through the main frame portion and through the side frame portions to the traveling wheels and the main frame portion, being held substantially elevated by the side frame portions, is prevented from sagging.

The invention will be understood from the following description taken in conjunction with the accompanying drawings, wherein like characters of reference are used to designate like parts, and wherein:

FIG. 1 is a top plan view of a rotary side delivery rake embodying the improved frame of the invention;

FIG. 2 is a top plan view of the frame per se;

FIG. 3 is a side elevational view of the frame, taken in the direction of the arrow 3 in FIGS. 1 and 2;

FIG. 4 is a side elevational view of the frame, taken in the direction or the arrows 4—4 in FIGS. 1 and 2; and FIG. 5 is an end elevational view of the frame, taken in the direction of the arrow 5 in FIGS. 1 and 2.

Referring now to the accompanying drawings in detail, the general reference numeral 10 designates a rotary side delivery rake which, except for the frame 12 hereinafter described in detail, is more-or-less conventional in construction. As such, the rake includes a draw bar 13, a pair of traveling wheels 14, and a set of raking wheels 15, the latter being mounted on the frame for raising and lowering movement in a manner well known in the art, as for example, in U.S. Pat. No. 3,167,900, dated Feb. 2, 1965, and others. Springs and other details associated with mounting of the raking wheels have not been shown in the accompanying drawings for sake of simplicity, and also because they form no part of the present invention The present invention concerns itself with the particular arrangement of the rake supporting frame 12 which is in the form of a slender, serpentine body such as may conveniently be formed integrally from tubular stock.

The frame 12 comprises what may be referred to as a main frame portion 16, this being disposed substantially horizontally and obliquely to the direction of travel D of the rake. The main frame portion 16 is provided at the front thereof with a rearwardly extending front side frame portion 17, and at the rear thereof with a forwardly extending rear side frame portion 18. It is to be particularly noted that the side frame portions 17 and 18 are slanted downwardly from the main frame portion 16, and conveniently terminate in downturned ends 17' and 18' respectively, such downturned ends being equipped with stub axles 19, projecting laterally outwardly to carry the traveling wheels 14.

Also, while the main frame portion 16 has been described as being substantially horizontally disposed, it preferably has a horizontal rear region 16a and a somewhat shorter, downwardly sloping front region 16b, the slope or declination of which is substantially coplanar with that of the front side frame portion 17, as will be apparent from FIG. 5.

The draw bar 13 is suitably connected to the main frame portion 16 which also carries the raking wheels 15, the whole frame, of course, being supported by the traveling wheels 14 at the terminal regions or ends 17' and 18' of the frame.

In conventional rake construction the weight of the raking wheel 15 on the main frame portion 16 frequently causes that frame portion to sag, but such sagging is eliminated by the particular frame arrangement of the invention wherein the main frame portion is held elevated by the side frame portions 17 and 18. As will be apparent from FIGS. 3, 4 and 5, the side frame portions 17 and 18 are well sloped downwardly from the main frame portion 16 and, particularly as shown in FIG. 5, the sloping arrangement forms what may be referred to as an arch, in which the main frame region 16a which carries the weight of most, if not all of the raking wheels, is located at the top of the arch, and the terminals 17' and 18' at the bottom of the arch are supported by the traveling wheels 14. Accordingly, forces imposed on the main frame portion 16 by the weight of the raking wheels 16 are dissipated longitudinally of the frame through the side frame portions 17 and 18 to the points of support at the traveling wheels, and sagging of the main frame portion is effectively eliminated. Moreover, the particular frame arrangement of the invention eliminates such sagging without the use of braces or other structural reinforcements which would otherwise render the rake more heavy, complicated and expensive.

While in the foregoing there has been described and shown the preferred embodiment of the invention, various modifications may became apparent to those skilled in the art to which the invention relates. Accordingly, it is not desired to limit the invention to this dsclosure, and various modifications and equivalents may be resorted to, falling within the spirit and scope of the invention as claimed.

What is claimed as new is:

1. In a rotary side delivery rake, a supporting frame provided with a pair of traveling wheels and with a set of upwardly and downwardly movable raking wheels, said supporting frame consisting of a slender serpentine body having a main frame portion disposed substantially horizontally and obliquely to the direction of travel of the rake, a front side frame portion extending rearwardly from the front of the main frame portion, and a rear side frame portion extending forwardly from the rear of the main frame portion, said main frame portion carrying said raking wheels, said front side and rear side frame portions slanting respectively rearwardly and downwardly and forwardly and downwardly from the main frame portion whereby the latter is substantially elevated above lower ends of the side frame portions, and laterally projecting stub axles provided at the lower ends of said side frame portions for mounting said traveling wheels.

2. The device as defined in claim 1 together with a draw bar connected to said main frace portion and projecting forwardly therefrom in said direction of travel.

3. The device as defined in claim 1 wherein said main frame portion and said side frame portions are formed integrally from tubular stock.

4. The device as defined in claim 1 wherein said main frame portion includes a horizontal rear region connected to said rear side frame portion, and a downwardly slanting front region connected to said front side frame portion, the front region being substantially shorter than the rear region.

References Cited

UNITED STATES PATENTS

| | | | |
|---|---|---|---|
| 3,015,201 | 1/1962 | Van Derlely et al. | 56—377 |
| 3,146,571 | 9/1964 | Wood | 56—377 |
| 3,320,735 | 5/1967 | Sutherland et al. | 56—377 |

F. BARRY SHAY, Primary Examiner

J. N. ESKOVITZ, Assistant Examiner